United States Patent
Pradeep et al.

(10) Patent No.: US 10,590,354 B2
(45) Date of Patent: Mar. 17, 2020

(54) PROCESS FOR THE CONVERSION OF CRUDE OIL TO LIGHT OLEFINS, AROMATICS AND SYNGAS

(71) Applicant: INDIAN OIL CORPORATION LIMITED, Mumbai (IN)

(72) Inventors: Ponoly Ramachandran Pradeep, Faridabad (IN); Arjun Kumar Kottakuna, Faridabad (IN); Terapalli Hari Venkata Devi Prasad, Faridabad (IN); Satyen Kumar Das, Faridabad (IN); Debasis Bhattacharyya, Faridabad (IN); Sanjiv Kumar Mazumdar, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

(21) Appl. No.: 16/206,946

(22) Filed: Nov. 30, 2018

(65) Prior Publication Data
US 2019/0256786 A1 Aug. 22, 2019

(30) Foreign Application Priority Data

Feb. 21, 2018 (IN) .............................. 201821006613

(51) Int. Cl.
| | |
|---|---|
| *C10G 57/00* | (2006.01) |
| *C10G 7/06* | (2006.01) |
| *C10G 9/36* | (2006.01) |
| *C10G 9/00* | (2006.01) |
| *C10G 11/05* | (2006.01) |

(Continued)

(52) U.S. Cl.
CPC .............. *C10G 57/00* (2013.01); *C10G 7/06* (2013.01); *C10G 9/005* (2013.01); *C10G 9/007* (2013.01); *C10G 9/36* (2013.01); *C10G 11/05* (2013.01); *C10G 11/18* (2013.01); *C10G 31/08* (2013.01); *C10G 51/00* (2013.01); *C10G 51/06* (2013.01); *C10G 55/00* (2013.01); *C10G 55/08* (2013.01); *C10G 2300/1051* (2013.01); *C10G 2300/1055* (2013.01); *C10G 2300/1059* (2013.01); *C10G 2300/708* (2013.01); *C10G 2400/20* (2013.01); *C10G 2400/30* (2013.01); *C10J 3/00* (2013.01); *C10J 2300/0943* (2013.01); *C10J 2300/1659* (2013.01); *C10J 2300/1665* (2013.01)

(58) Field of Classification Search
None
See application file for complete search history.

(56) References Cited

U.S. PATENT DOCUMENTS

2013/0197284 A1 8/2013 Bourane et al.
2013/0292299 A1 11/2013 Koseoglu et al.
(Continued)

FOREIGN PATENT DOCUMENTS

WO 2014/062465 A1 4/2014

*Primary Examiner* — Tam M Nguyen
(74) *Attorney, Agent, or Firm* — Maschoff Brennan

(57) ABSTRACT

The present invention relates to a process and system for complete conversion of crude oils by integrating delayed coking process, high severity catalytic cracking process and naphtha cracking processes along with olefin recovery section, aromatic recovery section and gasifier section to maximize the crude oil conversion to valuable products like light olefins, aromatics and chemicals.

16 Claims, 2 Drawing Sheets

(51) Int. Cl.
*C10G 51/06* (2006.01)
*C10G 55/08* (2006.01)
*C10G 55/00* (2006.01)
*C10G 31/08* (2006.01)
*C10G 11/18* (2006.01)
*C10G 51/00* (2006.01)
*C10J 3/00* (2006.01)

(56) References Cited

U.S. PATENT DOCUMENTS

| | | | |
|---|---|---|---|
| 2015/0321975 A1 | 11/2015 | Choi et al. | |
| 2016/0122668 A1 | 5/2016 | Sayed et al. | |
| 2016/0369187 A1* | 12/2016 | Ward | C10G 65/10 |
| 2017/0058213 A1* | 3/2017 | Oprins | C10G 35/04 |
| 2018/0155633 A1* | 6/2018 | Al-Ghamdi | C10G 67/0409 |
| 2018/0223197 A1* | 8/2018 | Al-Ghamdi | C10G 65/18 |
| 2018/0362866 A1* | 12/2018 | Ward | C10G 69/00 |

* cited by examiner

PROCESS FOR THE CONVERSION OF CRUDE OIL TO LIGHT OLEFINS, AROMATICS AND SYNGAS

FIELD OF THE INVENTION

The present invention relates to a process and system for complete conversion of crude oils by integrating delayed coking process, high severity catalytic cracking process and naphtha cracking process along with olefin recovery section, aromatic recovery section & gasifier section to maximize the crude oil conversion to valuable products like light olefins, aromatics and chemicals.

BACKGROUND OF THE INVENTION

With the emerging scenario of increasing penetration of 'Electric Vehicles' in the automobile sector and higher dependence on alternate renewable sources of energy, it is expected that the demand for conventional fuels like gasoline and diesel are bound to decrease. In such scenario, the refiners need to adopt novel technologies to change the product slate from conventional fuels into chemicals or petrochemical feedstocks produced from crude oil. Considering these, it is desired to have technologies and process schemes which can help in achieving the said objective of crude oil to chemical conversion.

U.S. Pat. No. US 2013/0292299 describes an integrated ebullated bed and hydrotreater for whole crude oil upgrading. The crude oil is first flashed into lighter components which are sent for hydrotreating in a fixed bed hydrotreater unit. The heavy atmospheric residue is hydrotreated in an ebullated bed hydrotreater reactor. Distillates from the hydrotreater and unconverted residue from ebullated bed reactions are combined to form a synthetic crude oil stream.

WO 2014/062465 describes a process for high severity catalytic cracking of crude oil. The crude oil is separated into high boiling fraction and low boiling fraction and are separately processed in two downer type of reactors. The deactivated catalyst from both vessels is regenerated in a common regenerator vessel.

U.S. Pat. No. US 2015/0321975 provides a process for producing aromatics from a hydrocarbon source in the presence of supercritical water. Supercritical water is used as an alternate to catalysts, which are not stable at these conditions. The dominant source of BTX aromatics are heavy aromatic compounds with single aromatic core with alkyl side chains.

U.S Pat. No. US 2013/0197284 describes an integrated hydrotreating, solvent deasphalting and steam pyrolysis process for complete conversion of crude oil. Here, crude oil after pretreatment is sent to hydrotreater and thereafter processed in solvent deasphalting unit. Deasphalter unit products are thermally converted in a steam Pyrolysis process.

U.S. Pat. No. US 2016/0122668 describes an integrated slurry hydroprocessing and steam Pyrolysis process for production of olefins and aromatic petrochemical feedstocks from crude oil feedstock. Crude oil is hydroprocessed to produce an effluent rich in hydrogen content and the said effluent is then routed to steam Pyrolysis unit to cause thermal cracking reactions. Mixed product stream is separated and the olefins and aromatic products are recovered.

OBJECT OF THE INVENTION

It is seen that different process routes have been described in the prior art for direct conversion of crude oil to light olefins and aromatics. It is worthwhile to note that in the prior art schemes where the complete crude oil is processed in catalytic cracking process unit, the heavy metals and other recalcitrant compounds can cause deactivation of catalysts employed in such processes. In case of processes where the crude oil fractions are thermally converted through steam Pyrolysis processes, the selectivity with respect to the desired products are hampered because of the inherently low selectivity of thermal cracking reaction mechanisms to produce light olefins. From this it is seen that there is a requirement for a process scheme for leveraging complete potential for upgrading the crude oil streams to valuable products like light olefins, aromatics and chemicals.

Also, the current invention overcomes the following limitation which exists in the prior arts:

Deactivation of catalysts in catalytic cracking units due to the heavy metals and other recalcitrant compounds.

Lesser light olefin product selectivity of the Pyrolysis process.

Higher $CO_2$ emissions while processing high CCR whole crude oils in catalytic cracking processes.

Accordingly, the main object of the present invention is to provide a process of converting the crude oils to generate valuable lighter hydrocarbon products comprising light olefins and chemicals.

Another object of the invention is to use an integrated delayed coking process, high severity catalytic cracking process, naphtha cracking process schemes in a manner as to enable complete conversion of crude into lighter hydrocarbons including light olefins and chemicals.

Still another object of the invention is to provide a process which employs olefin recovery section, aromatic recovery section & gasifier section for maximizing the benefits by the removal of the catalyst poisons using a Delayed Coker in the initial step of processing.

SUMMARY OF THE INVENTION

Accordingly, present invention provides an integrating process for conversion of crude oil to light olefin, aromatic, syngas and valuable chemical, the process comprising:

(i) charging the crude oil to a desalter unit to obtain a desalted crude oil;

(ii) routing the desalted crude oil to a pre-fractionator column to separate the desalted crude oil in to a lighter hydrocarbon material boiling below 200° C., a hydrocarbon boiling in the range of 200-370° C. and a heavier hydrocarbon material boiling above 370° C.;

(iii) routing the lighter hydrocarbon material to a naphtha cracker unit to obtain a high aromatic gasoline stream;

(iv) routing the heavier hydrocarbon material boiling above 370° C. from the pre-fractionator column to a delayed coker unit, wherein the hydrocarbon material boiling above 370° C. undergoes thermal cracking reaction to obtain a gaseous products containing LPG, lighter product materials boiling in the range of naphtha, coker gasoil stream and solid petroleum coke;

(v) routing the hydrocarbons boiling in the range of 200-370° C. from the pre-fractionator column to a high severity catalytic cracker unit wherein the hydrocarbons boiling in the range of 200-370° C. undergo catalytic cracking reaction to generate a clarified oil stream, gaseous products containing LPG, light cycle oil product and lighter products boiling in the range of naphtha;

(vi) routing the gaseous products containing LPG generated from the delayed coker unit and the gaseous products containing LPG generated from the high severity catalytic cracking unit to an olefin recovery section to obtain light olefins;

(vii) routing the high aromatic gasoline stream generated from the naphtha cracker unit and the light cycle oil product from the high severity catalytic cracking unit to an aromatic recovery section for recovery of aromatic products; and (viii) routing the solid petroleum coke produced in the delayed coker unit to a coke gasifier unit where it is converted to syngas, and the syngas is sent to a chemical production section to obtain a valuable chemicals comprising methanol and light olefins.

In one of the feature of the present invention, the lighter product materials boiling in the range of naphtha from the delayed coker unit, the lighter products boiling in the range of naphtha from the high severity catalytic cracker unit, and a paraffinic raffinate stream from the aromatic recovery section are sent to naphtha cracker unit for cracking to a valuable lighter products.

In another feature of the present invention, the coker gasoil stream is subjected to high severity catalytic cracker unit and the clarified oil stream is subjected to the delayed coker unit.

In yet another feature of the present invention, the light olefins from the olefin recovery section comprising ethylene, propylene, and butylene are separated and C5-materials other than the light olefins from the olefin recovery section are recycled back to the naphtha cracker unit for further conversion.

In one feature of the present invention, optionally the hydrocarbons boiling in the range of 200-370° C. from the pre-fractionator column is routed to the delayed coker unit.

In one feature of the present invention, optionally the heavier boiling material is routed to a visbreaker unit, where it undergoes mild thermal conversion to obtain a gaseous product, a naphtha product, a visbreaker gasoil stream, and a visbroken tar product; wherein:

the gaseous product is routed to the olefin recovery section;
the naphtha product is sent to the naphtha cracker unit;
the visbreaker gasoil stream is sent to the high severity catalytic cracking unit; and
the visbroken tar product is routed to the delayed coker unit.

In yet another feature of the present invention, optionally the hydrocarbons boiling in the range of 200-370° C. from the pre-fractionator column is routed to the visbreaker unit.

In yet another feature of the present invention, the pre-fractionator column is operated at pressure in the range of 1-2 Kg/cm² (g) and top temperature in the range of 150° C. to 250° C.

In yet another feature of the present invention, coke drum in the delayed coker unit is operated at a temperature ranging from 470° C. to 520° C., pressure ranging from 0.5 to 5 Kg/cm² (g) and residence time provided in the coke drum is kept more than 10-26 hours.

In yet another feature of the present invention, the high severity catalytic cracker unit is operated at a temperature of 550° C. to 650° C., and reactor pressure in the range of 0.7 to 2.5 Kg/cm2 (g), and the catalyst to oil weight ratio is the range of 10 to 25.

In yet another feature of the present invention, the naphtha cracker unit is operated at a temperature in the range of 580° C. to 670° C., reactor pressure in the range of 0.7 to 2.5 Kg/cm² (g), the catalyst to weight oil ratio is selected from the range of 15 to 30.

In yet another feature of the present invention, the high severity gasoil catalytic cracker unit employs a circulating fluidized bed reactor configuration and a catalyst mixture containing 'large pore bottom selective active material' of pore size more than 50 Å, Y/REY/USY/RE-USY zeolites of medium pore size of 7 to 11 Å and shape selective pentasil zeolite components.

In one of the feature of the present invention, the thermal cracking reaction is occurred in the delayed coker unit (DCU) before the catalytic cracking reaction is occurred in the catalytic cracker unit.

Accordingly, the present invention also provides a system to implement an integrating process for conversion of crude oil to light olefin, aromatic, syngas and valuable chemical, the system comprising:

(i) a desalter unit to obtain a desalted crude oil from a crude oil;

(ii) a pre-fractionator column to receive the desalted crude oil from the desalter unit and separate the desalted crude oil in to a lighter hydrocarbon material boiling below 200° C., hydrocarbon boiling in the range of 200-370° C. and heavier hydrocarbon material boiling above 370° C.;

(iii) a naphtha cracker unit to receive the lighter hydrocarbon material boiling below 200° C. from the pre-fractionator column and generate a high aromatic gasoline stream;

(iv) a delayed coker unit to receive the heavier boiling hydrocarbon material boiling above 370° C. from the pre-fractionator column, wherein the hydrocarbon material undergoes thermal cracking reaction in the delayed coker unit to generate gaseous products containing LPG, lighter product materials boiling in the range of naphtha, coker gasoil stream and solid petroleum coke;

(v) a high severity catalytic cracker unit to receive the hydrocarbon boiling in the range of 200-370° C. from the pre-fractionator column wherein the hydrocarbons boiling in the range of 200-370° C. undergo catalytic cracking reaction to generate a clarified oil stream, gaseous products containing LPG, light cycle oil product and lighter products boiling in the range of naphtha;

(vi) an olefin recovery section to receive the gaseous products containing LPG generated from the delayed coker unit and the gaseous products containing LPG generated from the high severity catalytic cracking unit to provide light olefins;

(vii) an aromatic recovery section to receive the high aromatic gasoline stream generated from the naphtha cracker unit and light cycle oil product from the high severity catalytic cracking unit for recovery of aromatic products; and (viii) a coke gasifier unit to receive the solid petroleum coke produced in the delayed coker unit for converting it to syngas, and a chemical production section to receive the syngas for generating a valuable chemicals comprises methanol and light olefin.

In one of the feature of the present invention, the system optionally comprises a visbreaker unit for receiving the heavier boiling material wherein the heavier boiling material undergoes mild thermal conversion to obtain a gaseous product, a naphtha product, a visbreaker gasoil stream, and a visbroken tar product.

In another feature of the present invention the delayed coker unit is placed before the high severity catalytic cracker unit.

DETAILED DESCRIPTION OF THE INVENTION

Figure 1:
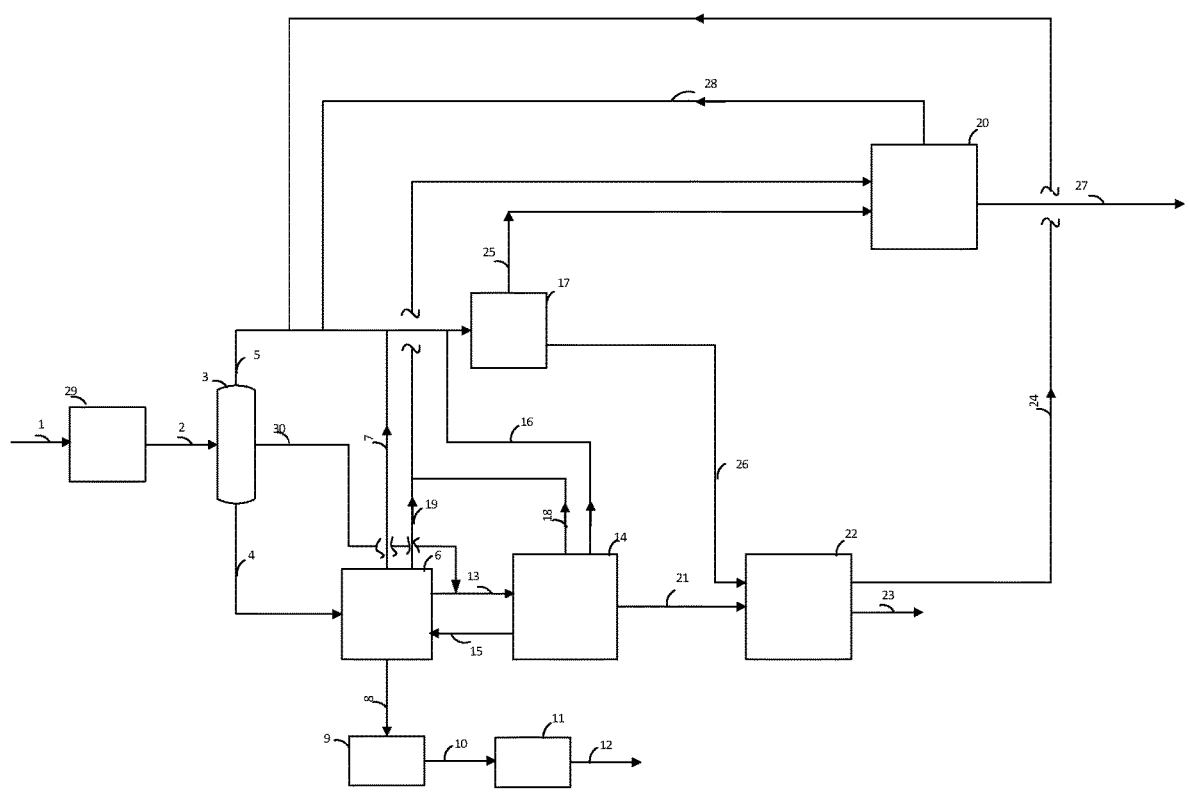
FIG. 1 illustrates schematic of high crude processing scheme or system of present invention.

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternative falling within the scope of the invention as defined by the appended claims.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

Feedstock

The liquid hydrocarbon feedstock is used in the process is selected from crude oils covering all varieties of crude oils including opportunity crudes and also the blends of the same. Density of these crude oils is more than 0.9 g/cc and Conradson Carbon Residue (CCR) content more than 4 wt %.

Process Conditions

In the process of present invention, the crude oil pre-fractionator operates at pressure in the range of 1-2 Kg/cm$^2$ (g) and top temperature in the range of 150° C. to 250° C. Preferably, in the process of present invention, the crude oil pre-fractionator operates at top temperature in the range of 190° C. to 210° C. These process conditions are fine tuned to enable separation of lighter boiling (<200° C.) naphtha range compounds from the crude. The top temperature of the present invention is an operating temperature of a distillation column which is referred by the temperature of the top tray of the column.

Coke drums in the delayed coking section of the process is operated at a higher severity with desired operating temperature ranging from 470° C. to 520° C. Preferably coke drums in the delayed coking section of the process is operated at a higher severity with desired operating temperature ranging from 480° C. to 500° C. The coke drum in the delayed coking section of the process is operated at a pressure ranging from 0.5 to 5 Kg/cm$^2$ (g). Preferably the coke drum in the delayed coking section of the process is operated at a pressure ranging from 0.6 to 3 Kg/cm$^2$ (g). The residence time provided in coke drums is kept more than 10 hours.

High severity catalytic cracker unit as described in present invention is used for conversion of coker gasoil stream from delayed coker unit is essentially a fluid catalytic cracking unit operated at a high reactor outlet temperature of 550° C. to 650° C. Preferably the fluid catalytic cracking unit operated at a high reactor outlet temperature of 580° C. to 620° C. Reactor pressure is varied in the range of 0.7 to 2.5 Kg/cm$^2$ (g). Preferably the reactor pressure is varied in the range of 0.8 to 1.5 Kg/cm$^2$ (g). The catalyst to oil ratio is selected from the range of 10 to 25. Preferably, the catalyst to oil ratio is in the range of 15 to 20.

Naphtha cracker unit for conversion of naphtha streams from pre-fractionator, delayed coker and high severity gasoil catalytic cracker unit is a catalytic naphtha cracker unit, in which case it is operated at a high reactor outlet temperature of 580° C. to 670° C. Preferably it is operated at a high reactor outlet temperature of 590° C. to 630° C. Reactor pressure is varied in the range of 0.7 to 2.5 Kg/cm$^2$ (g). Preferably the reactor pressure is varied in the range of 0.8 to 1.5 Kg/cm$^2$ (g). The catalyst to oil ratio is selected from the range of 15 to 30. Preferably the catalyst to oil ratio is selected in the range of 15 to 25. Naphtha cracker unit is also a thermal cracking unit without use of any catalyst.

Catalyst

In the process scheme of present invention, no catalysts are employed in pre-fractionator and delayed coking process units. High severity gasoil catalytic cracker unit employs a circulating fluidized bed reactor configuration and a catalyst mixture containing 'large pore bottom selective active material' of pore size more than 50 Å, Y/REY/USY/RE-USY zeolites of medium pore size of 7 to 11 Å and shape selective pentasil zeolite components. Catalytic naphtha cracker unit employs a catalyst composition, with predominantly shape selective pentasil zeolite based catalyst components.

Description of Process and System Flow Scheme

In the process and system of present invention as depicted in FIG. 1, the crude oil (1) is routed to a desalter unit (29) for desalting, where under the application of electric field, the salts and sediments are removed from the crude oil. The desalted crude oil (2) is then routed to the pre-fractionator column (3) to remove the lighter hydrocarbon material boiling below 200° C. like naphtha (5), hydrocarbons boiling in the range of 200-370° C. (30) and the heavier material boiling above 370° C. (4). The lighter hydrocarbon material boiling below 200° C. (5) is routed to the naphtha cracker unit (17). Hydrocarbons boiling in the range of 200-370° C. (30) is sent to the high severity catalytic cracker unit (14). Heavier boiling material (4) is then routed to the delayed coker unit (6). In the delayed coker unit (6), the hydrocarbon material undergoes thermal cracking reactions at high temperature conditions. Gaseous products containing LPG (19) generated from the delayed coker unit (6) is sent to the olefin recovery section (20). The lighter product materials boiling in the range of naphtha (7) from the delayed coker unit (6) is routed to the naphtha cracker unit (17). The coker gasoil stream (13) is sent to high severity catalytic cracker unit (14). The clarified oil stream (15) generated in the high severity catalytic cracker unit (14) is routed to the delayed coker unit (6). The lighter products boiling in the range of naphtha (16) from high severity catalytic cracker unit (14) is routed to the high naphtha cracker unit (17). Gaseous products containing LPG (18) generated from the high severity catalytic cracking unit (14) is sent to the olefin recovery section (20). The light olefins (27) like ethylene, propylene, butylene, etc. are separated from other components like hydrogen, ethane, propane, C4 saturated hydrocarbons in the olefin recovery section (20). A stream (28) comprising ethane, propane, C4 saturated hydrocarbons are recycled back to the naphtha cracker unit (17) for complete conversion. The high aromatic gasoline stream (26) generated in the naphtha cracker unit (17) and light cycle oil product (21) from the high severity catalytic cracking unit (14) are sent to the aromatic recovery section (22) for recovery of aromatic products (23). The paraffinic raffinate stream (24) from the aromatic recovery section (22) is sent to naphtha cracker unit (17) for further conversion. The solid petroleum coke (8) produced in the delayed coker unit (6) is sent to a coke gasifier unit (9) where it is converted to syngas (10), a precursor for a variety of chemicals. Syngas is sent to chemical production section (11), where several valuable chemicals (12) like methanol, light olefins etc. can be produced.

In one feature of the present invention, the hydrocarbons boiling in the range of 200-370° C. (30) from the pre-fractionator column (3) is routed to the delayed coker unit (6).

Figure 2:
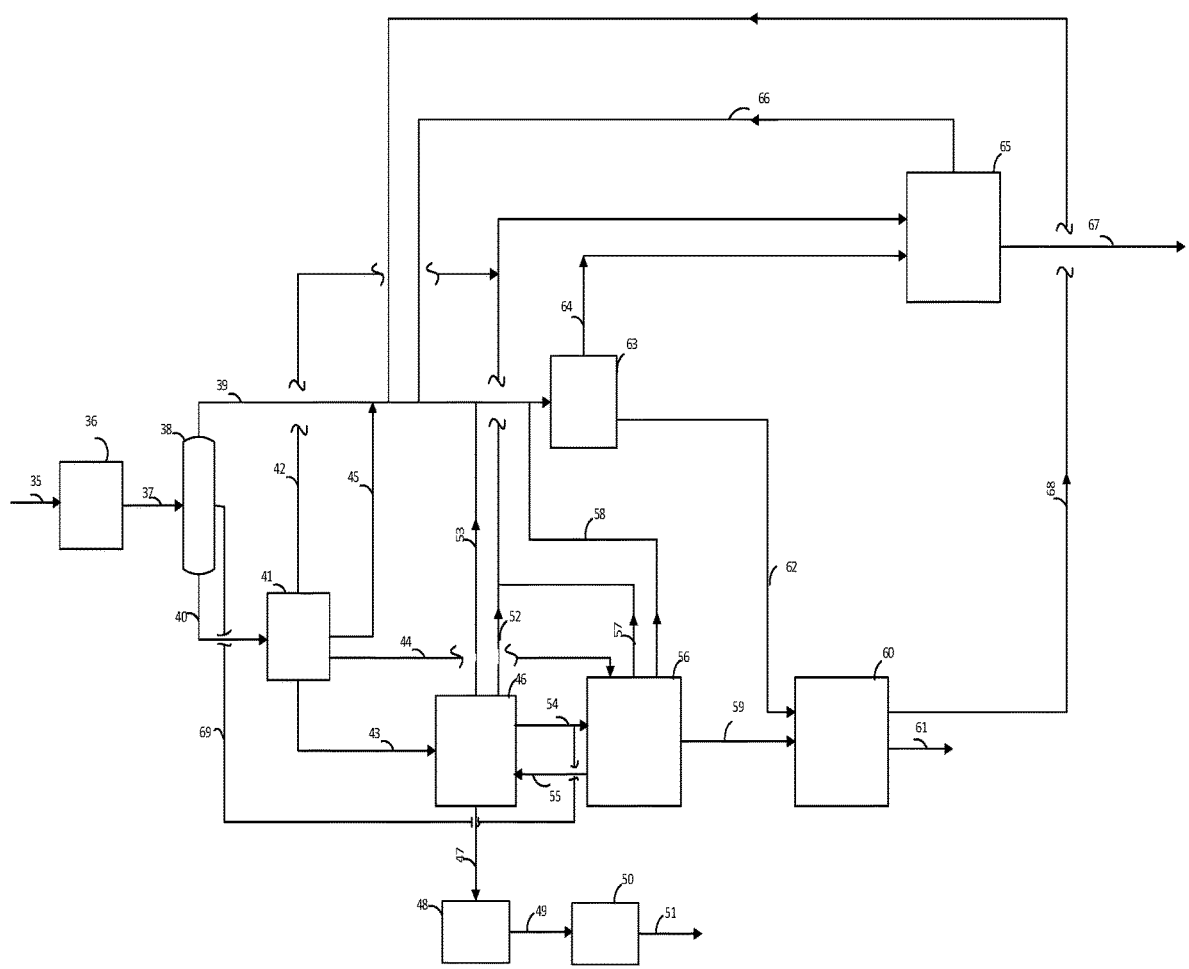
FIG. 2 illustrates schematic of embodiment of present invention for high crude processing scheme or system including a visbreaker unit.

In another feature of the present invention as depicted in FIG. 2, the crude oil (35) is routed to a desalter unit (36) for desalting, where under the application of electric field, the salts and sediments are removed from the crude oil. The desalted crude oil (37) is then routed to the pre-fractionator column (38) to remove the lighter hydrocarbon material boiling below 200° C. like naphtha (39), hydrocarbons boiling in the range of 200-370° C. (69) and the heavier boiling material boiling above 370° C. (40). The lighter hydrocarbon material (39) is routed to the naphtha cracker unit (63). Hydrocarbons boiling in the range of 200-370° C. (69) is sent to the high severity catalytic cracker unit (56). Heavier boiling material (40) is then routed to the visbreaker unit (41), where it undergoes mild thermal conversion. The gaseous product (42) from the visbreaker unit (41) is routed to the olefin recovery section (65). The naphtha product (45) from the visbreaker (41) is sent to the naphtha cracker unit (63). The visbreaker gasoil stream (44) from the visbreaker unit (41) is sent to the high severity catalytic cracking unit (56). The visbroken tar product (43) from the visbreaker unit (41) is routed to the delayed coker unit (46). In the delayed coker unit (46), the hydrocarbon material undergoes thermal cracking reactions at high temperature conditions. The gaseous products containing LPG (52) generated from the delayed coker unit (46) is sent to the olefin recovery section (65). The lighter product materials boiling in the range of naphtha (53) from the delayed coker unit (46) is routed to the naphtha cracker unit (63). The coker gasoil stream (54) is sent to high severity catalytic cracker unit (56). The clarified oil stream (55) generated in the high severity catalytic cracker unit (56) is routed to the delayed coker unit (46). The lighter products boiling in the range of naphtha (58) from high severity catalytic cracker unit (56) is routed to the naphtha cracker unit (63). Gaseous products containing LPG (57) generated from the high severity catalytic cracking unit (56) is sent to the olefin recovery section (65). In the olefin recovery section (65) the light olefins (67) like ethylene, propylene, butylene etc. are separated. The C5-materials (66) other than the light olefins are recycled back to the naphtha cracker unit (63) for further conversion. The high aromatic gasoline stream (62) generated in the naphtha cracker unit (63) and light cycle oil product (59) from the high severity catalytic cracking unit (56) are sent to the aromatic recovery section (60) for recovery of aromatic products (61). The paraffinic raffinate stream (68) from the aromatic recovery section (60) is sent to naphtha cracker unit (63) for cracking to valuable lighter products. The solid petroleum coke (47) produced in the delayed coker unit (46) is sent to a coke gasifier unit (48) where it is converted to syngas (49), a precursor for a variety of chemicals. Syngas (49) is sent to chemical production section (50), where several valuable chemicals (51) like methanol, light olefins etc. can be produced.

In yet another feature of the present invention, the hydrocarbons boiling in the range of 200-370° C. (69) from the pre-fractionator column (38) is routed to the delayed coker unit (46).

In yet another feature of the present invention, the hydrocarbons boiling in the range of 200-370° C. (69) from the pre-fractionator column (38) is routed to the visbreaker unit (41).

In yet another feature of the present invention, the naphtha cracker unit employed in the invention is a thermal naphtha cracker unit without use of any catalyst, operating at high temperatures of the order of 750 to 870° C.

Advantage of using the Visbreaker unit in the FIG. 2 of the present invention is the additional conversion of the feedstock due to mild thermal cracking reactions which is taken place in the Visbreaker, prior to further processing. This additional conversion generates additional yields of naphtha and gaseous products which can be sent to the naphtha cracker unit for light olefin production. Second advantage is that by incorporating an additional thermal cracking unit in the scheme, there is an incremental generation of 'aromatic' molecules which increase the yield of aromatic products in the aromatic recovery section.

In a conventional refinery configuration, the presence of aromatic molecules in the feed stream to a 'catalytic cracker unit' is considered as a hindrance to meet the final product qualities and also result in higher hydrogen consumption in the product treatment sections. For example, if the aromatic content of light cycle oil (LCO) from catalytic cracker unit is high, the hydrogen consumption in hydrotreater unit (used for treatment of LCO to make diesel) is high. In the present invention, additional thermal cracking unit (DCU) is placed before the catalytic cracker unit, which further enhances the aromatic content of the LCO from catalytic cracker unit. This higher aromatic containing LCO sent to the aromatic recovery section enhances the yield of aromatics.

The placing of Delayed Coker unit before the catalytic cracker unit also helps in reducing the content of catalyst poisons (heavy metals like Nickel, Vanadium) in the feedstock of catalytic cracker unit. This occurs due to the formation of solid carbonaceous coke in Delayed coker unit and it is well known in the art that metals are concentrated in the coke in Delayed coker and other products are relatively metal free. This scheme thus reduces the content of metals in the catalytic cracker feedstock. It is also known in the art of catalytic cracking that if metal content in the feedstock is less, the deactivation of catalyst will be lower and the fresh catalyst make up rate also will be lower.

Advantages of the Present Invention

The present invention has the following advantages over the prior art:
High conversion of crude oil to light olefins, aromatics and syngas
No requirement of crude oil distillation unit (CDU), vacuum distillation unit (VDU) for separation of crude oil
Catalyst poisons are deposited in Coke generated in Delayed Coker unit
High conversions achievable in high severity gasoil cracker unit
High yield of propylene compared to ethylene, from naphtha cracker unit
No/Minimum use of costly corrosion inhibitors, even in case of opportunity crude processing

The invention claimed is:
1. An integrating process for conversion of crude oil to light olefin, aromatic, syngas and valuable chemical, the process comprising:

(i) charging the crude oil to a desalter unit to obtain a desalted crude oil;

(ii) routing the desalted crude oil to a pre-fractionator column to separate the desalted crude oil in to a lighter hydrocarbon material boiling below 200° C., a hydrocarbon boiling in the range of 200-370° C. and a heavier hydrocarbon material boiling above 370° C.;

(iii) routing the lighter hydrocarbon material to a naphtha cracker unit to obtain a high aromatic gasoline stream;

(iv) routing the heavier hydrocarbon material boiling above 370° C. from the pre-fractionator column to a delayed coker unit, wherein the hydrocarbon material boiling above 370° C. undergoes thermal cracking reaction to obtain a gaseous products containing LPG, lighter product materials boiling in the range of naphtha, coker gasoil stream and solid petroleum coke;

(v) routing the hydrocarbons boiling in the range of 200-370° C. from the pre-fractionator column to a high severity catalytic cracker unit wherein the hydrocarbons boiling in the range of 200-370° C. undergo catalytic cracking reaction to generate a clarified oil stream, gaseous products containing LPG, light cycle oil product and lighter products boiling in the range of naphtha;

(vi) routing the gaseous products containing LPG generated from the delayed coker unit and the gaseous products containing LPG generated from the high severity catalytic cracking unit to an olefin recovery section to obtain light olefins;

(vii) routing the high aromatic gasoline stream generated from the naphtha cracker unit and the light cycle oil product from the high severity catalytic cracking unit to an aromatic recovery section for recovery of aromatic products; and (viii) routing the solid petroleum coke produced in the delayed coker unit to a coke gasifier unit where it is converted to syngas, and the syngas is sent to a chemical production section to obtain a valuable chemicals comprising methanol and light olefins.

2. The process as claimed in claim 1, wherein the lighter product materials boiling in the range of naphtha from the delayed coker unit, the lighter products boiling in the range of naphtha from the high severity catalytic cracker unit, and a paraffinic raffinate stream from the aromatic recovery section are sent to naphtha cracker unit for cracking to a valuable lighter products.

3. The process as claimed in claim 1, wherein the coker gasoil stream is subjected to high severity catalytic cracker unit and the clarified oil stream is subjected to the delayed coker unit.

4. The process as claimed in claim 1, wherein the light olefins from the olefin recovery section comprising ethylene, propylene, and butylene are separated and C5-materials other than the light olefins from the olefin recovery section are recycled back to the naphtha cracker unit for further conversion.

5. The process as claimed in claim 1, wherein optionally the hydrocarbons boiling in the range of 200-370° C. from the pre-fractionator column is routed to the delayed coker unit.

6. The process as claimed in claim 1, wherein optionally the heavier boiling material is routed to a visbreaker unit, where it undergoes mild thermal conversion to obtain a gaseous product, a naphtha product, a visbreaker gasoil stream, and a visbroken tar product; wherein:

the gaseous product is routed to the olefin recovery section;

the naphtha product is sent to the naphtha cracker unit;

the visbreaker gasoil stream is sent to the high severity catalytic cracking unit; and the visbroken tar product is routed to the delayed coker unit.

7. The process as claimed in claim 1, wherein optionally the hydrocarbons boiling in the range of 200-370° C. from the pre-fractionator column is routed to the visbreaker unit.

8. The process as claimed in claim 1, wherein the pre-fractionator column is operated at pressure in the range of 1-2 $Kg/cm^2$ (g) and top temperature in the range of 150° C. to 250° C.

9. The process as claimed in claim 1, wherein coke drum in the delayed coker unit is operated at a temperature ranging from 470° C. to 520° C., pressure ranging from 0.5 to 5 $Kg/cm^2$ (g) and residence time provided in the coke drum is kept more than 10-26 hours.

10. The process as claimed in claim 1, wherein the high severity catalytic cracker unit is operated at a temperature of 550° C. to 650° C., and reactor pressure in the range of 0.7 to 2.5 Kg/cm2 (g), and the catalyst to oil weight ratio is the range of 10 to 25.

11. The process as claimed in claim 1, wherein the naphtha cracker unit is operated at a temperature in the range of 580° C. to 670° C., reactor pressure in the range of 0.7 to 2.5 $Kg/cm^2$ (g), the catalyst to weight oil ratio is selected from the range of 15 to 30.

12. The process as claimed in claim 1, wherein the high severity gasoil catalytic cracker unit employs a circulating fluidized bed reactor configuration and a catalyst mixture containing 'large pore bottom selective active material' of pore size more than 50 Å, Y/REY/USY/RE-USY zeolites of medium pore size of 7 to 11 Å and shape selective pentasil zeolite components.

13. The process as claimed in claim 1, wherein the thermal cracking reaction is occurred in the delayed coker unit (DCU) before the catalytic cracking reaction is occurred in the catalytic cracker unit.

14. A system to implement an integrating process for conversion of crude oil to light olefin, aromatic, syngas and valuable chemical, the system comprising:

(i) a desalter unit to obtain a desalted crude oil from a crude oil;

(ii) a pre-fractionator column to receive the desalted crude oil from the desalter unit and separate the desalted crude oil in to a lighter hydrocarbon material boiling below 200° C., hydrocarbon boiling in the range of 200-370° C. and heavier hydrocarbon material boiling above 370° C.;

(iii) a naphtha cracker unit to receive the lighter hydrocarbon material boiling below 200° C. from the pre-fractionator column and generate a high aromatic gasoline stream;

(iv) a delayed coker unit to receive the heavier boiling hydrocarbon material boiling above 370° C. from the pre-fractionator column, wherein the hydrocarbon material undergoes thermal cracking reaction in the delayed coker unit to generate gaseous products containing LPG, lighter product materials boiling in the range of naphtha, coker gasoil stream and solid petroleum coke;

(v) a high severity catalytic cracker unit to receive the hydrocarbon boiling in the range of 200-370° C. from the pre-fractionator column wherein the hydrocarbons boiling in the range of 200-370° C. undergo catalytic cracking reaction to generate a clarified oil stream, gaseous products containing LPG, light cycle oil product and lighter products boiling in the range of naphtha;

(vi) an olefin recovery section to receive the gaseous products containing LPG generated from the delayed coker unit and the gaseous products containing LPG generated from the high severity catalytic cracking unit to provide light olefins;

(vii) an aromatic recovery section to receive the high aromatic gasoline stream generated from the naphtha cracker unit and light cycle oil product from the high severity catalytic cracking unit for recovery of aromatic products; and (viii) a coke gasifier unit to receive the solid petroleum coke produced in the delayed coker unit for converting it to syngas, and a chemical production section to receive the syngas for generating a valuable chemicals comprises methanol and light olefin.

15. The system as claimed in claim 14, wherein the system optionally comprises a visbreaker unit for receiving the heavier boiling material wherein the heavier boiling material undergoes mild thermal conversion to obtain a gaseous product, a naphtha product, a visbreaker gasoil stream, and a visbroken tar product.

16. The system as claimed in claim 14, wherein the delayed coker unit is placed before the high severity catalytic cracker unit.

* * * * *